(12) United States Patent
Wabel

(10) Patent No.: US 11,598,558 B2
(45) Date of Patent: *Mar. 7, 2023

(54) SOLAR AIR HEATER

(71) Applicant: John Wabel, Redmond, WA (US)

(72) Inventor: John Wabel, Redmond, WA (US)

( * ) Notice: Subject to any disclaimer, the term of this patent is extended or adjusted under 35 U.S.C. 154(b) by 296 days.

This patent is subject to a terminal disclaimer.

(21) Appl. No.: 17/060,424

(22) Filed: Oct. 1, 2020

(65) Prior Publication Data

US 2021/0018224 A1    Jan. 21, 2021

Related U.S. Application Data

(63) Continuation of application No. 16/168,506, filed on Oct. 23, 2018, now Pat. No. 10,830,496.

(60) Provisional application No. 62/576,503, filed on Oct. 24, 2017.

(51) Int. Cl.
| | |
|---|---|
| *F24D 5/12* | (2006.01) |
| *F24S 20/67* | (2018.01) |
| *F24D 19/10* | (2006.01) |
| F24D 5/00 | (2022.01) |
| F24F 7/10 | (2006.01) |
| F24D 5/04 | (2006.01) |

(52) U.S. Cl.
CPC .......... *F24S 20/67* (2018.05); *F24D 19/1093* (2013.01); *F24D 5/005* (2013.01); *F24D 5/04* (2013.01); *F24D 5/12* (2013.01); *F24D 2200/14* (2013.01); *F24F 7/10* (2013.01)

(58) Field of Classification Search
CPC ........ F24D 19/1093; F24D 5/04; F24D 5/005; F24D 2200/14; F24D 5/12; F24S 20/67; F24S 10/80; F24S 70/10; F24F 7/10
See application file for complete search history.

(56) References Cited

U.S. PATENT DOCUMENTS 10,830,496 B2 * 11/2020 Wabel ..................... F24S 20/67
2021/0088254 A1 * 3/2021 Wabel ..................... F24S 10/80
2021/0148607 A1 * 5/2021 Wabel ................. F24D 19/1093

* cited by examiner

*Primary Examiner* — Alfred Basichas
(74) *Attorney, Agent, or Firm* — Mohr Intellectual Property Law Solutions, PC

(57) ABSTRACT

A method, system, apparatus, and/or device for preheating air for a rooftop air handling unit (RTU). The method, system, apparatus, and/or device may include a barrier system configured to surround the RTU. The barrier system may include a structure to provide a frame for the barrier system, a first barrier configured to connect to a first side of the structure, and a collector configured to connect to a second side of the structure. The method, system, apparatus, and/or device may include a duct configured to connect between the collector and a chamber. The method, system, apparatus, and/or device may include a chamber configured to connect to an air intake hood of the RTU. The chamber may include a first opening to receive air stored in the cavity, a second opening to receive external air, and a diverter configured to switch between a first position and a second position.

20 Claims, 12 Drawing Sheets

SOLAR AIR HEATER

CROSS-REFERENCE TO RELATED APPLICATION

This application claims the benefit of U.S. patent application Ser. No. 16/168,506, filed on Oct. 23, 2018, which claims priority to U.S. Provisional Application Ser. No. 62/576,503, filed Oct. 24, 2017, the contents of which are incorporated by reference in their entirety.

BACKGROUND

Solar collectors may be used to convert solar energy into heat energy. Solar collectors may be used in multiple applications to reduce a reliance on fossil fuel powered devices. For example, solar collectors may be used in the heating of residential and commercial buildings.

BRIEF DESCRIPTION OF THE DRAWINGS

The present description will be understood more fully from the detailed description given below and from the accompanying drawings of various embodiments of the present embodiment, which, however, are not be taken to limit the present embodiment to the specific embodiments, but are for explanation and understanding only.

DETAILED DESCRIPTION

Figure 1A:
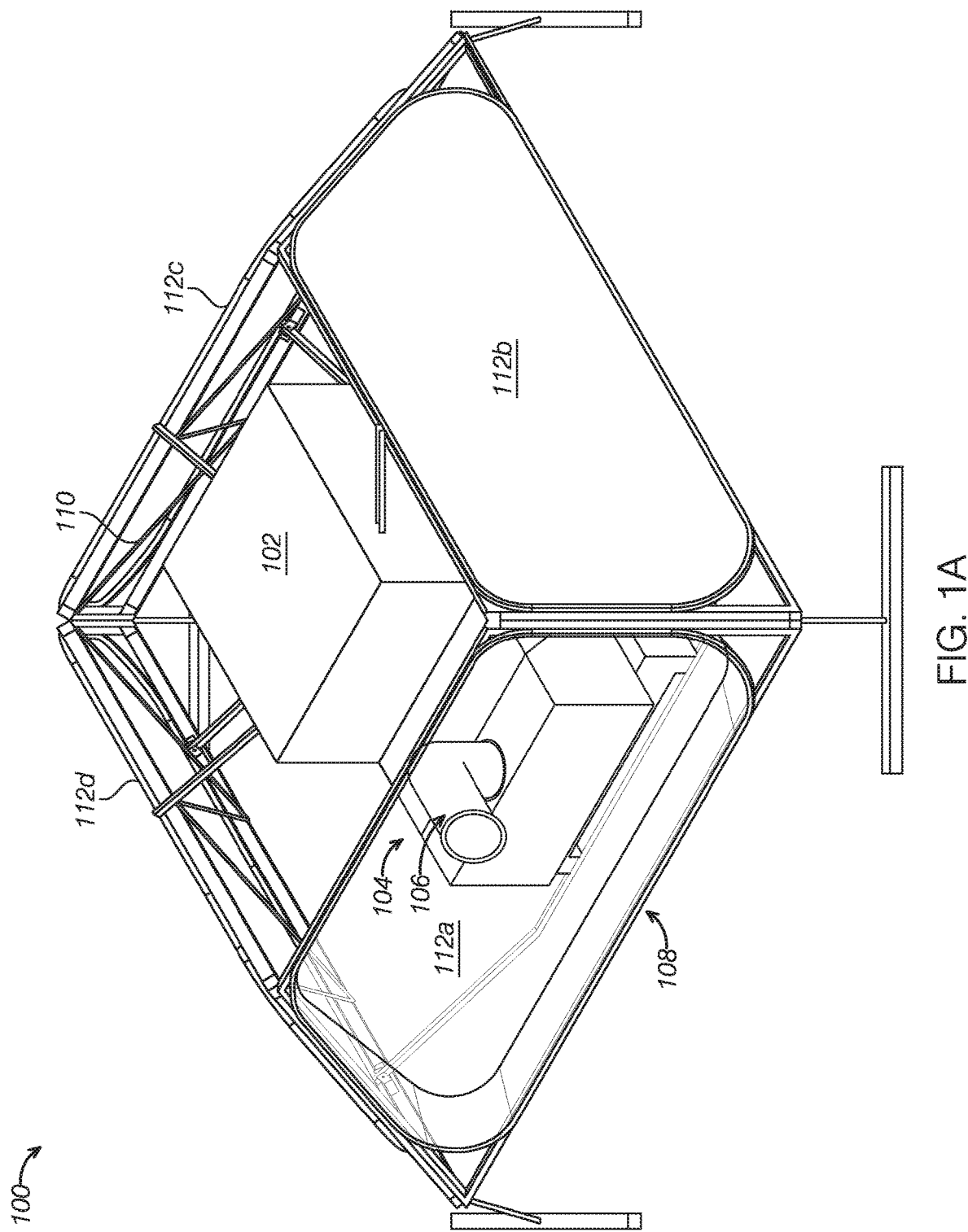
FIG. 1A illustrates a side perspective view of a solar air heating system connected to a rooftop air handling unit (RTU), according to an embodiment.

The disclosed solar air heaters will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, a variety of solar air heater examples are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

A solar collector may be used as a solar air heater to supply heat to residential homes and commercial buildings. Conventional solar collectors may employ a collector plate for converting solar energy into heat. The collector plate is located inside a housing with a light-transmitting barrier for passing incident solar radiation. The solar radiation passes through the barrier and is absorbed by the collector plate and converted into heat. The converted heat energy may be transferred to a fluid or air to heat the fluid or air, respectively. The heated fluid or heated air may then be conveyed away for the solar collector and used to subsequently heat residential homes or commercial building.

Conventionally, the construction of solar air heaters may be expensive. The solar air heaters may be constructed out of metal and may be required to adhere to regulatory standards. Additionally, conventional solar air heaters may be cumbersome to install. For example, may regulatory standards require equipment screening on the three sides of a rooftop air handling unit (RTU) that are not used for solar collection. Additionally, to connect conventional solar air heaters with RTUs may require modifications and alterations to the RTU, which may increase the cost of installation. The modifications may also decrease the efficiency of the RTU or damage the RTU.

The embodiments described herein may, therefore, include a solar air heat system that may be connected to an RTU to preheat air that is used by the RTU to heat a building. In one embodiment, the solar air heater may be configured to reduce a cost on the construction of the solar air heater. In another embodiment, the solar air heater may be configured to connect to the RTU without modifying or altering the RTU.

FIG. 1A illustrates a side perspective view of a solar air heating system 100 connected to a rooftop air handling unit (RTU) 102, according to an embodiment. The solar air heating system 100 may include a chamber 104, an air duct 106, and a barrier system 108. The chamber 104 may be connected to the RTU 102.

The RTU 102 may be an air handling unit (AHU) that regulates and circulates air as part of a heating, ventilating, and air-conditioning (HVAC) system. The RTU 102 may be a relatively large metal box that includes blowers, heating or cooling elements, filter racks or chambers, sound attenuators, or dampers. The RTU 102 may connect to a ductwork ventilation system that distributes the conditioned air through a residence or commercial building.

The chamber 104 pre-heats air to provide pre-heated air to the RTU 102 for circulation in a residence or commercial building. The barrier system 108 may provide a visual boundary or barrier to restrict an individual from unintentionally accessing the chamber 104 and the RTU 102. The barrier system 108 may include a structure 110 and one or more barriers, such as barriers 112a-112d. The barriers 112a-112d may include a fabric material. In one embodiment, the fabric material of one or more of the barriers 112a-112d may be a woven polypropylene material. In another embodiment, the fabric material of one or more of barriers the 112a-112d may be a cotton material, a silk material, a linen material, a wool material, a leather material, a hemp material, and so forth. In another embodiment, the fabric material of one or more of the barriers 112a-112d may be fire-retardant material. In another embodiment, the fabric material of one or more of the barriers 112a-112d may be porous to allow for movement of air through the material. In another example, the fabric material of one or more of the barriers 112a-112d may be fire-rated, porous woven black fabric or perforated black fabric allowing a designated quantity of air to flow through it at a specific pressure drop. In another embodiment, the fabric material of one or more of the barriers 112a-112d may be porous to allow wind to move through the fabric material to reduce or substantially eliminate a wind load on the barrier system 108 so that increased winds may not lift or move the barrier system 108.

In one embodiment, an air duct 106 may connect one of the barriers 112a-112d to the chamber 104 so that the chamber 104 may receive pre-heated air before providing the air to the RTU 102. For example, outside air may pass through the barrier 112a via the air duct 106 to the chamber 104. In one example, the fabric material of the barrier 112a may be porous to allow air to move through the fabric material into the chamber 104. In another example, the air duct 106 may be a flexible air duct. In another example, the air duct 106 may be an insulated conduit between the barrier 112a and the chamber 104.

In another embodiment, the chamber 104 may be a plenum. The plenum may be a container or structure with an air-filled space that receives air from through one of the barriers 112a-112d. For example, the plenum may be connected to the barrier 112a. As the air moves through the barrier 112a, the plenum may receive the air. In another embodiment, a fan of the RTU 102 may pull in outside air through the chamber 104.

In one embodiment, one or more of the barriers 112a-112b may be a dark-colored material that may capture solar energy and convert the solar energy into heat energy. For example, the barrier 112a may include a black fabric material that heats up when bombarded by solar energy. In this example, the barrier 112a may be a transpired solar collector where the fabric heats up air as it passes through the fabric. In another example, the barrier 112a may include a cavity to store the heated air. The heated air may flow from the cavity of the barrier 112a to the chamber 104, where the chamber 104 may further heat the air that is provided to the RTU 102. The barrier 112a may include the fabric material to provide a sufficient surface area to absorb solar energy as heat and then transfer that heat to air as the air passes through the fabric material to the chamber 104. In another embodiment, the chamber 104 may include a fan to pull air through the barrier 112a and/or the air duct 106.

In another embodiment, one or more of the barriers 112a-112d may include plastic material, metal material, or other material that may heat up when bombarded by solar energy. In another example, the barrier 112a may include an absorber plate that heats up when bombarded by solar energy. As the absorber plate heats up, at least a portion of the heat radiates from the absorber plate into the air and increases the temperature of the air as the air passes through the fabric material to the chamber 104. In another embodiment, the barriers 112a-112d may include the fabric material, the plastic material, the metal material, and/or the other material to heat up air surrounding the outside of the chamber 104 and/or the RTU 102. In one example, each of the barriers 112a-112d may include black fabric material that may absorb solar energy and convert the solar energy into heat. The heat from the fabric material may increase a temperature of the air in a cavity or space within the barriers 112a-112d. The heated air in the cavity or space may increase a temperature of the chamber 104 and/or the RTU 102 such that thermal energy from the chamber 104 and/or the RTU 102 may not radiate from the chamber 104 and/or the RTU 102 and will remain at the chamber 104 and/or the RTU 102.

Figure 1B:
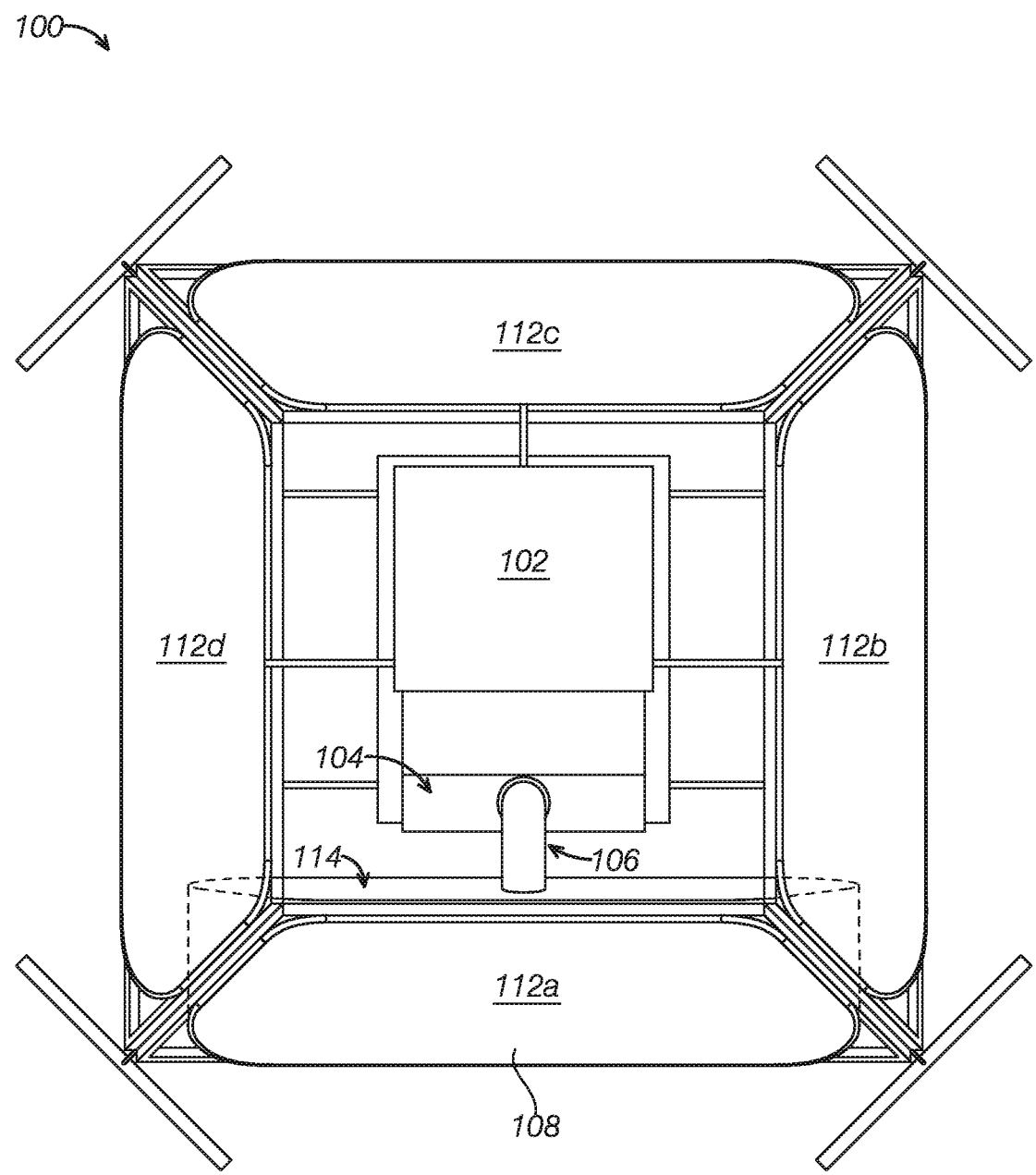
FIG. 1B illustrates a top view of a solar air heating system connected to an RTU, according to an embodiment.

FIG. 1B illustrates a top view of a solar air heating system 100 connected to the RTU 102, according to an embodiment. Some of the features in FIG. 1B are the same or similar to some of the features in FIG. 1A as noted by same reference numbers, unless expressly described otherwise. As discussed above, the solar air heating system 100 may include a chamber 104 to preheat air and/or provided the air to the RTU 102. As further discussed above, an air duct 106 may connect the chamber 104 to one of the barriers 112a-112d, such as barrier 112a. In one embodiment, the barrier 112a or at least a portion of the barrier 112a may include an air collector 114.

The air collector 114 may be a container that captures or stores a portion of air that passes through an exterior portion of the barrier 112a. The air collector 114 may include material that allows for air to pass from outside the air collector 114 into a cavity of the air collector 114. The air collector 114 may then heat the air within the cavity. In one embodiment, the air collector 114 may include material that may convert solar energy into thermal energy. For example, the air collector 114 may include black fabric material that may absorb light energy or solar energy from the sun and convert the light energy or solar energy into thermal energy or heat. The thermal energy may then radiate from the black fabric material and heat the air stored in the cavity of the air collector 114. In another embodiment, the air collector 114 may include a first material at a front of the barrier 112a that is porous to allow the air to enter the cavity and a second material that may capture the air to heat or increase the temperature of the air as the thermal energy is transferred from the first material to the air.

As the air is heated in the cavity of the air collector 114, the air may then be transferred from the cavity of the air collector 114 to the chamber 104 via the air duct 106. As discussed above, the chamber 104 may further increase the temperature of the air within the chamber 104. As further discussed below, the chamber 104 may be configured to have an open position that allows the preheated air to be transferred from the chamber 104 to the RTU 102 and a closed position that allows outside or external air to be directed to the RTU 102.

Figure 2A:
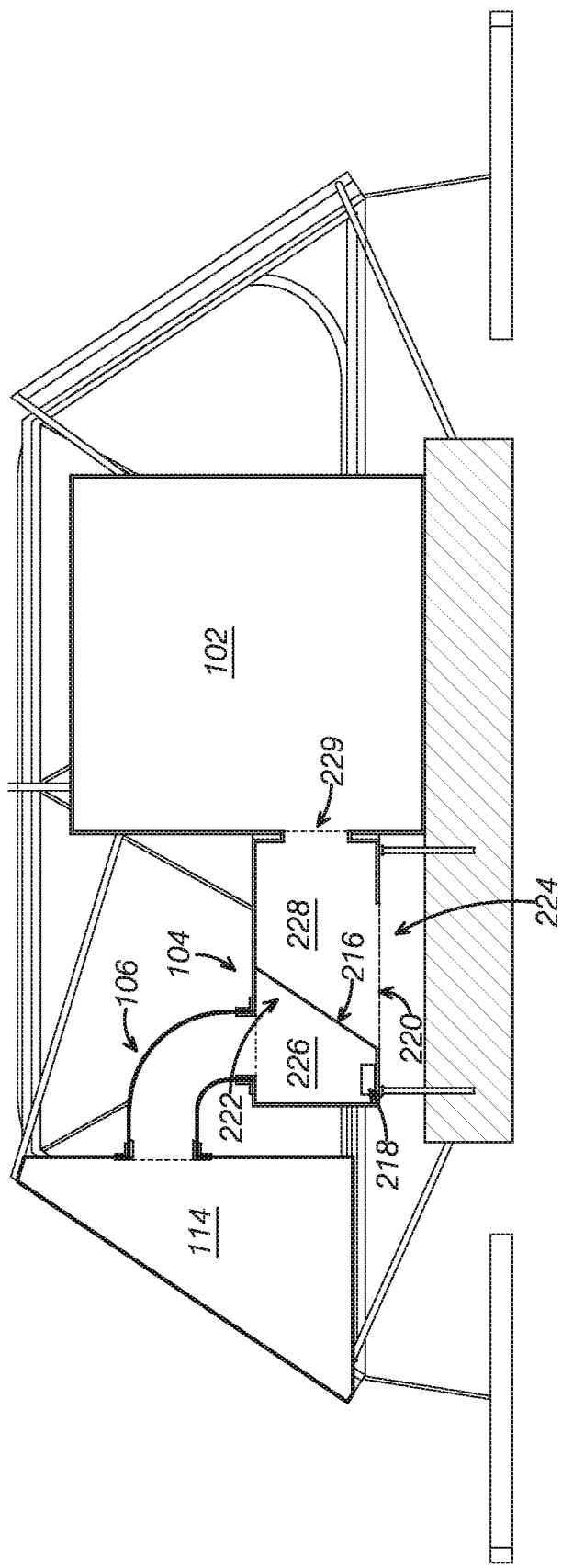
FIG. 2A illustrates a side exposed view of the solar air heating system, according to an embodiment.

FIG. 2A illustrates a side exposed view of the solar air heating system 100, according to an embodiment. Some of the features in FIG. 2A are the same or similar to some of the features in FIGS. 1A-1B as noted by same reference numbers, unless expressly described otherwise.

The chamber 104 may include a diverter 216, a motor 218, and an external air opening 220. In one example, the chamber 104 may be a container, such as a box or a plenum, that is connected to the air duct 106. As discussed above, the chamber 104 may receive heated air via an opening connected to the air duct 106. A portion of the chamber 104 may also include an external air opening 220 that may provide an opening for the chamber 104 to receive non-preheated air from the external or outside environment. In one embodiment, the cavity of the chamber 104 may include a first portion 226 and a second portion 228.

The first portion 226 may include an opening connected to the air duct 106 to receive the preheated air. The preheated air may be stored or contained within the first portion of the cavity. The second portion 228 may include the external air opening 220 to receive external air.

In one embodiment, the chamber 104 may include the diverter 216 connected to the motor 218 within the cavity of the chamber 104. The motor 218 may be configured to rotate the diverter 216 between an outside air configuration 222 and a preheated air configuration 224. In one embodiment, the diverter 216 may be a hinged flap. In another embodiment, the diverter 216 may be a polycarbonate sheet or sheet metal. In another embodiment, the motor 218 may rotate the diverter 216 between a first position for the outside air configuration 222 and a second position for the preheated air configuration 224. In one example, the first position may be a vertical position where the diverter 216 is at a 90-degree angle relative to a bottom of the chamber 104. When the diverter 216 is in the first position, the diverter 216 may form a barrier or a wall between the first portion 226 of the cavity of the chamber 104 and the second portion 228 of the cavity of the chamber 104. When the diverter 216 is in the first position, the chamber 104 may direct air external to the chamber 104 to an opening 229 of the chamber 104 that is at a top of the second portion 228 that abuts an air intake of the RTU 102.

In another example, the second position may be a vertical position where the diverter 216 is coplanar or horizontal relative to a bottom of the chamber 104. When the diverter 216 is in the second position, the diverter 216 may form a barrier or a wall over the external air opening 220 such that external air may not enter the cavity of the chamber 104 and may not be directed to the RTU 102. When the diverter 216 is in the second position, the preheated air stored in the cavity of the chamber 104 may be directed via the opening 229 to the RTU 102 to provide the RTU 102 with air that has a temperature higher the temperature of the external air.

The motor 218 may switch the diverter between the outside air configuration 222 and the pre-heated air configuration 224 based on an outside temperature approximate to the chamber 104. In one embodiment, when the outside temperature is below a threshold temperature level, the motor 218 may rotate the diverter 216 to be in the preheated air configuration 224 so that the chamber 104 provides air via the opening 229 to the RTU 102 that has been preheated by the collector 112 and/or the chamber 104. The chamber 104 may provide the RTU 102 with pre-heated air to reduce the amount of energy the RTU 102 uses to heat the air to a threshold level prior to circulating the air into a residence or commercial building. When the outside temperature is equal to or exceed the threshold temperature level, the motor 218 may rotate the diverter 216 to the vertical position to block the air in the first portion 226 of the chamber from being provided to the RTU 102 and allow the air from the external air opening 220 to be provided to the RTU 102 via the chamber 104.

In one embodiment, the threshold temperature level may be set as a standard temperature level for air supplied to the RTU 102. For example, the RTU 102 may require that the temperature of the air provided to the RTU be at least 57 degrees Fahrenheit (F). When the outside air is below 57° F., the chamber 104 may provide preheated air that is at least 57° F. When the outside air is equal to or exceeds 57° F., the chamber 104 may provide outside air to the RTU 102.

In one example, when the external or outside air temperature is at least 57° F., the motor 218 may be energized or engaged to start pushing a piston that pushes the diverter 216 upward and by the time the outside air temperature is 60° F. the motor 218 may fully extend the piston to close off the air flow from the first portion 226 of the chamber 104. When the air flow from the first portion 226 of the chamber 104 is closed off, the external air opening 220 may be fully opened to the external air such that the RTU 102 receives the external air from the chamber 104.

In another example, when the external or outside air temperature is at below 57° F. the motor 218 may be energized or engaged to start to pull the piston that pulls the diverter 216 upward or backward to open the air flow from the first portion 226 of the chamber 104. When the air flow from the first portion 226 of the chamber 104 is open, the external air opening 220 may be closed off such that the RTU 102 receives the preheated air from the chamber 104. The motor 218 may keep the diverter 216 in the same position until the outside temperature changes from below the threshold temperature to above the threshold temperature or vice versa.

In one embodiment, the motor 218 may be a wax motor. The wax motor may be a linear actuator device that converts thermal energy into mechanical energy using a phase-changing wax to actuate the motor 218. For example, as wax melts, the wax may contract in volume and as the wax solidifies the wax may expand in volume. As the wax contracts or expands, the contraction or expansion may actuate the motor 218 to switch the positions of the diverter 216. When the motor 218 is a wax motor, the chamber 104 may not use electricity to actuate the motor to switch the positions of the diverter 216. In another embodiment, the motor 218 may be an electric motor, a gas motor, or a solar-powered motor and may use electricity or another source of power to actuate the motor 218 to switch the positions of the diverter 216. In one example, as the wax contracts the motor 218 may pull the diverter 216 into the first position 226 and when the wax expands the motor 218 may push the diverter 216 into the second position 228, or vice versa.

Figure 2B:
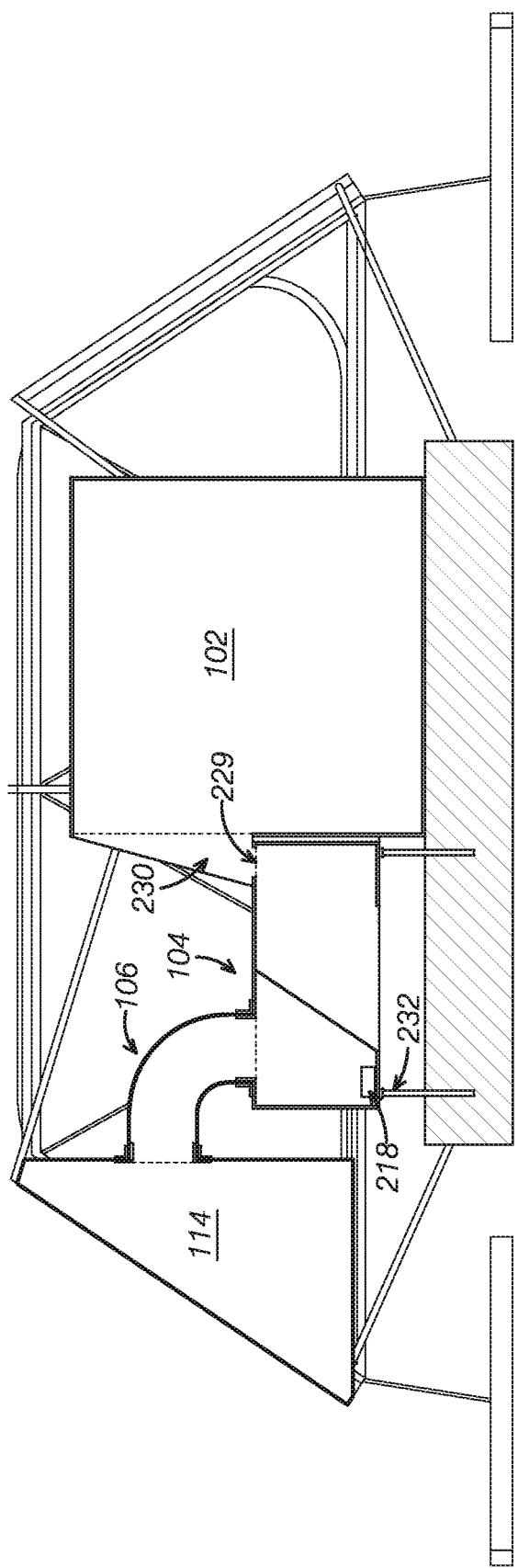
FIG. 2B illustrates the chamber providing air to the RTU from below an air vent or air intake hood of the RTU, according to an embodiment.

FIG. 2B illustrates the chamber 104 providing air to the RTU 102 from below an air intake or air intake hood 230 of the RTU 102, according to an embodiment. Some of the features in FIG. 2B are the same or similar to some of the features in FIGS. 1A-2B as noted by same reference numbers, unless expressly described otherwise. In one embodiment, the chamber 104 may be connected to the RTU 102 with fasteners. The fasteners may include straps, bolts, epoxy, and so forth. In another embodiment, the chamber 104 may be placed below the air intake 230 of the RTU 102 such that while the opening 229 of the chamber 104 is not physically connected to the air intake 230, the chamber 104 is positioned under the air intake 230 so that as the RTU 102 pulls air in air from the air intake 230, the air will be pulled from the chamber 104 via the opening 229. In one example, a height of the chamber 104 may be adjusted to fit beneath the RTU 102 so that when a fan of the RTU 102 pulls air from the outside to circulate new air into a residence or building, the RTU 102 may pull the air from the opening 229 of the chamber 104.

In another embodiment, a support structure 232 that supports the chamber 104 may be located beneath the chamber 104. When the chamber 104 is connected to the RTU 102 or positioned approximate the RTU 102, the chamber 104 may be placed or positioned against the RTU 102 so that the opening 229 of the chamber 104 is located underneath the air intake 230 of the RTU 102.

In one embodiment, the support structure 232 of the chamber 104 may include legs that may be adjusted so that the opening 229 of the chamber 104 abuts the bottom of the air intake 230 of the RTU 102. Once the adjustable legs of the support structure 232 have been adjusted, the adjustable legs may be secured a roof that the RTU 102 rests on, such as by screwing the adjustable legs of the support structure 232 to the roof. In one example, the chamber 104 may be adjusted to slope down at a downward angle or up at an upward angle so that water may flow off a top of the chamber 104. To adjust the upward or downward angle of the chamber 104, one or more adjustable legs of the support structure 232 may be raised or lowered in height.

In another example, to access the bottom of the air intake 230 of the RTU 102, the chamber 104 may be removed from the support structure 232, such as unscrewing or unfastening the chamber 104 from the support structure 232 and removing the chamber 104. When the chamber 104 has been removed from the support structure 232, an individual may access a bottom of the air intake 230.

Figure 2C:
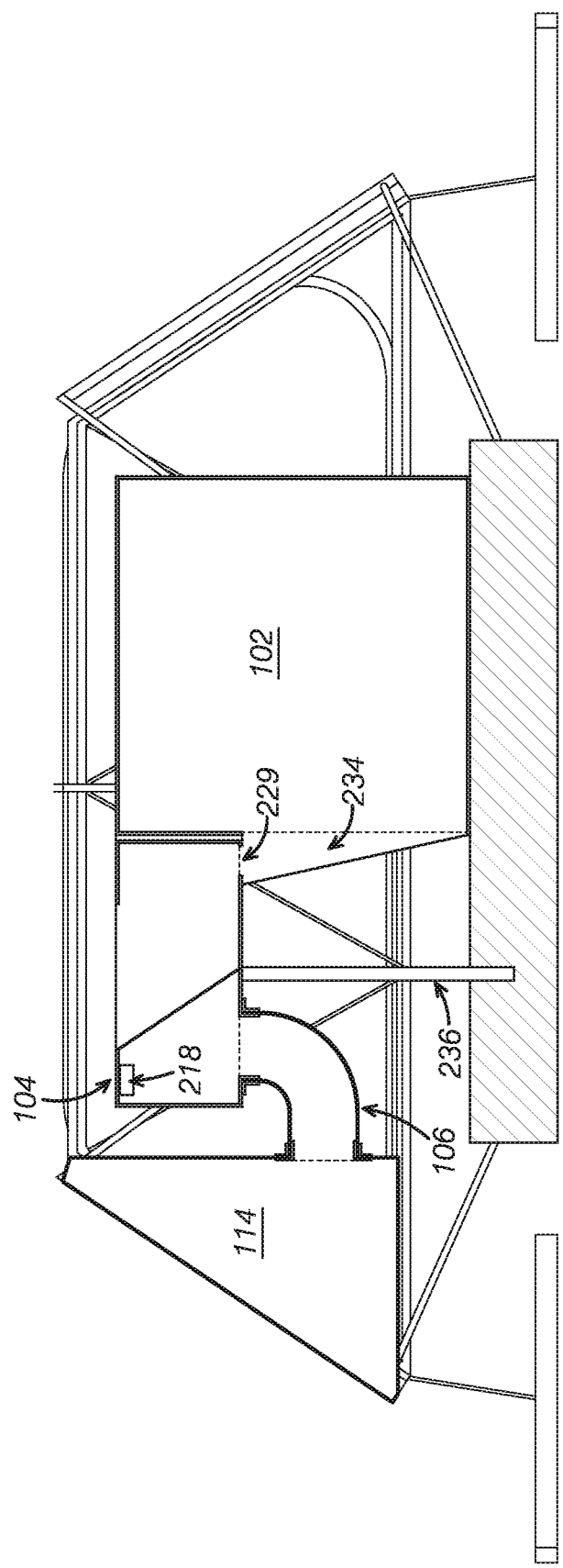
FIG. 2C illustrates the chamber providing air to the RTU from above an air vent of the RTU, according to an embodiment.

FIG. 2C illustrates the chamber 104 providing air to the RTU 102 from above an air vent 234 of the RTU 102, according to an embodiment. Some of the features in FIG. 2C are the same or similar to some of the features in FIGS. 1A-2B as noted by same reference numbers, unless expressly described otherwise. The configuration of the RTU 102 may vary based on the type of building the RTU 102 is connected to and/or the type of ventilation system of the building that the RTU 102 is connected to. As discussed in FIG. 2B, the RTU 102 may include an air intake 230 that is facing downward with an opening of the air intake 230 that opens at a bottom of the air intake 230. In another embodiment, the RTU 102 may include an air vent 234 that faces upward with an opening at the top of the air vent 234. In this embodiment, the chamber 104 may be positioned such that the opening 229 of the chamber 104 may face downward toward the opening at the top of the air vent 234. When the chamber 104 is positioned above the top of the air vent 234, the chamber 104 may be supported by a support structure 236 with one or more adjustable legs. In one example, the support structure 236 may fully support the chamber 104. In another example, at least a portion of the chamber 104 may be supported by the air vent 234. For example, a front portion of the chamber 104 may rest on a top of the air vent 234.

Figure 2D:
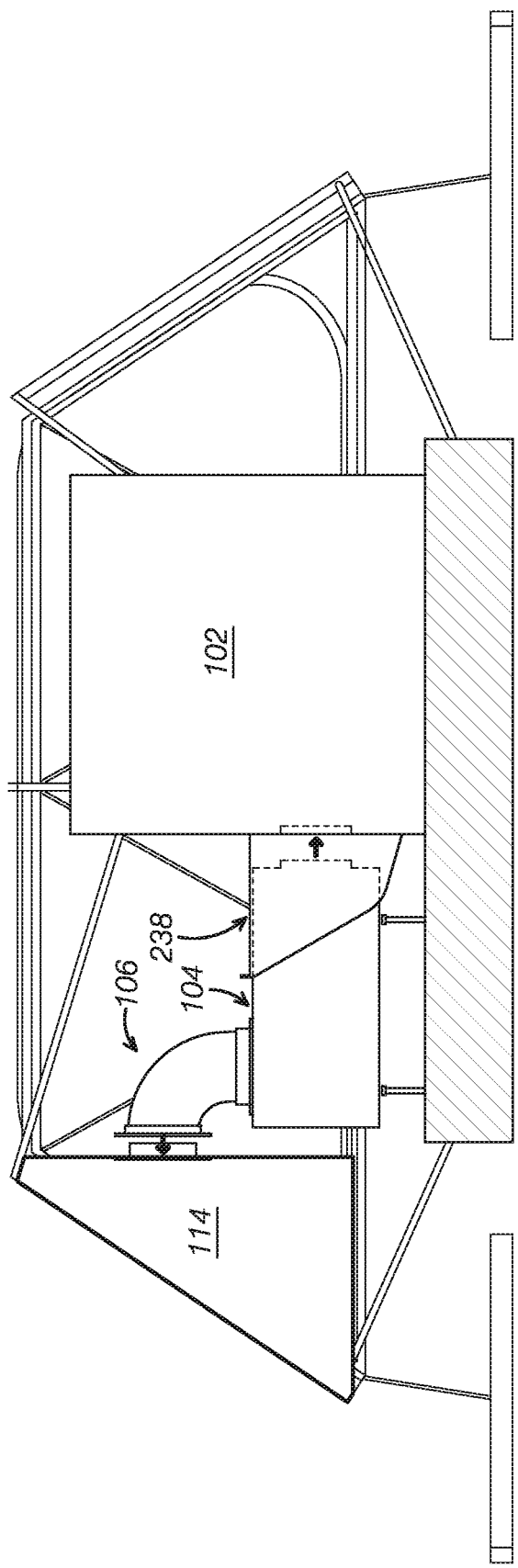
FIG. 2D illustrates the chamber being partially inserted into an air vent of the RTU, according to an embodiment.

FIG. 2D illustrates the chamber 104 being partially inserted into an air vent 238 of the RTU 102, according to an embodiment. Some of the features in FIG. 2D are the same or similar to some of the features in FIGS. A-2C as noted by same reference numbers, unless expressly described otherwise. As discussed above, the configuration of the RTU 102 may vary based on the type of building the RTU 102 is connected to and/or the type of ventilation system of the building that the RTU 102 is connected to. In one embodiment, the RTU 102 may include an air vent 238 that extends outward from a side of the RTU 102. In this embodiment, the chamber 104 may be at least partially be inserted into an opening at an end of the air vent 238. For example, an end of the chamber 104 with the opening 229 may be positioned at least partially within the opening of the air vent 238. In another embodiment, when the chamber 104 is inserted at least partially into the air vent 238, the air vent 238 may support the chamber 104. For example, the chamber 104 may be slightly smaller (such as 1 millimeter to 25 millimeters smaller) than a cavity of the air vent 238 such that the chamber 104 may rest within the cavity of the air vent 238 and be supported by the air vent 238.

Figure 3A:
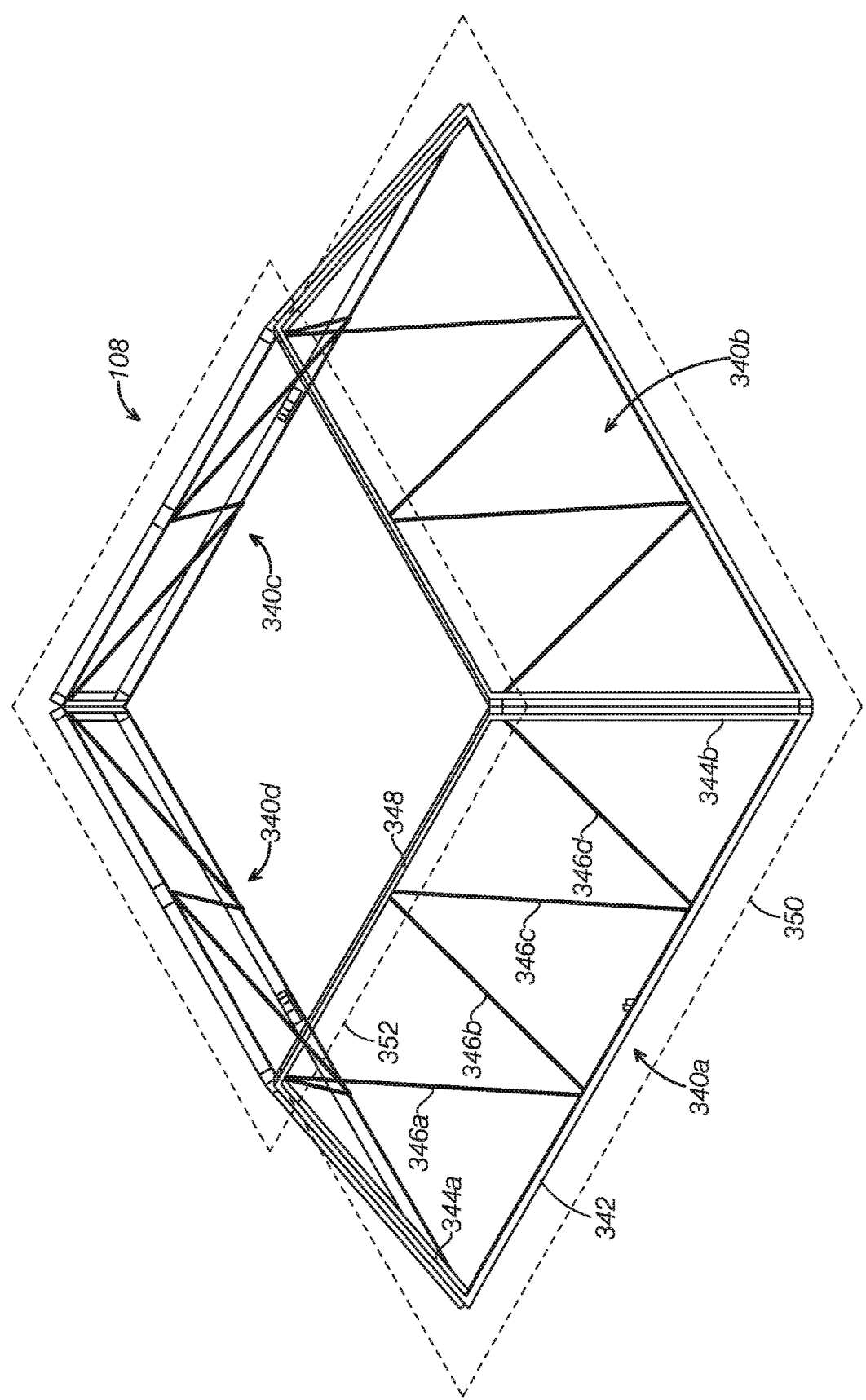
FIG. 3A illustrates a top perspective view of the structure of the solar air heating system, according to an embodiment.

FIG. 3A illustrates a top perspective view of the structure 110 of the solar air heating system 100, according to an embodiment. Some of the features in FIG. 3A are the same or similar to some of the features in FIGS. 1A-2D as noted by same reference numbers, unless expressly described otherwise. As discussed above, the barrier system 108 may provide a visual boundary or barrier to restrict an individual from unintentionally accessing the chamber 104 and the RTU 102 in FIG. 1A. The barrier system 108 may include the structure 110 that one or more barriers 112a-112d may be attached to. The structure 110 may include one or more sub-structures. The number, configuration, and dimension of the sub-structures of the structure 110 discussed below are not intended to be limiting but rather provide examples of the sub-structures of the structure 110.

In one embodiment, the structure 110 may include sub-structures 340a, 340b, 340c, and 340d. The sub-structures 340a, 340b, 340c, and 340d may have the same configuration. While sub-structure 340a is discussed below, sub-structures 340b, 340c, and 340d may have the same configuration and/or components and are not discussed separately.

The sub-structure 340a may include a base support 342, side supports 344a and 344b, cross supports 346a-346d, and a top support 348. In one embodiment, the base support 342 may extend horizontally along a first plane 350 and the top support 348 may extend horizontally along a second plane 352. The first side support 344a may be connected to a first end of the base support 342 and extend from the first plane 350 upwardly to the second plane 352. The second side support 344b may be connected to a second end of the base support 342 and extend from the first plane 350 upwardly to the second plane 352. In one embodiment, the base support 342 and the top support 348 may be the same length such that the base support 342, the top support 348, the first side support 344a, and the second side support 344b form a square or a rectangle shaped frame. In another embodiment, the base support 342 and the top support 348 may be different lengths such that the base support 342, the top support 348, the first side support 344a, and the second side support 344b form a trapezoid shaped frame.

In another embodiment, the cross supports 346a-346d may extend between the base support 342 and the top support 348 within the perimeter of the frame formed by the base support 342, the top support 348, the first side support 344a, and the second side support 344b. In one example, one or more of the cross supports 346a-346d may extend perpendicularly from the base support 342 and the top support 348. In another example, one or more of the cross supports 346a-346d may extend at an angle from the base support 342 and the top support 348. The cross supports 346a-346d reinforce the sub-structure 340a in which the cross supports 346a-346d are support braces or intersecting braces that may increase a structural integrity and rigidity of the sub-structure 340a. The number of cross supports for the sub-structure 340a is not intended to be limiting. For example, the sub-structure 340a may include a single cross support or multiple cross supports. As discussed above, the sub-structure 340a may support the air collector 114 in FIG. 1B and/or the barrier 112a.

In another embodiment, the sub-structures 340a-340d may be interconnected to form the structure 110. In one example, the sub-structures 340a-340d may be connected at the side supports 344a and/or 344b. For example, the side support 344a of sub-structure 340a may be connected to the side support of the sub-structure 340d and the side support 344b of sub-structure 340b may be connected to a side support of sub-structure 340b. The sub-structures 340b-340d may be similarly interconnected. In one example, one or more of the sub-structures 340a-340d may be positioned perpendicularly or vertically relative to the ground or a floor. In one example, one or more of the sub-structures 340a-340d may be positioned at an angle relative to the ground or a floor. The angle may be between 1 degree and 89 degrees or 91 degrees and 179 degrees. In one embodiment, the first sub-structure 340a and the third sub-structure 340c may be angled inward toward an RTU and the second sub-structure 340b and the fourth sub-structure 340d may be perpendicular relative to the ground or floor such that the second sub-structure 340b and the fourth sub-structure 340d extend upwardly at the same angle as the RTU. In another embodiment, the sub-structure 340a-340d may be perpendicular relative to the ground or floor to form a square structure.

In one embodiment, one or more sections of the sub-structure 340a may be adjustable in width and/or height. For example, the base support 342, the top support 348, the first side support 344a, the second side support 344b, and/or the cross supports 346a-346d may be adjustable in length. In another example, the sub-structure 340a may be adjusted along a lateral plane to move right or left to avoid obstacles. For example, the sub-structure 340a may be adjusted laterally to move the sub-structure 340a along the lateral plane. In one example, the sub-structure 340a may include an adjuster to adjust a height and/or length of the sub-structure 340a. In one example, the adjuster may include a first pipe or beam with a first diameter at least partially inserting into a second pipe or beam with a second diameter. In this example, when the amount that the first pipe or beam is inserted into the second pipe or beam is a defined amount to adjust the sub-structure 340a to a desired height and/or length, a fastener may be adjusted to keep maintain the amount the first pipe or beam is inserted. The fastener may be screws, push buttons, and so forth to secure the first pipe or beam to the second pipe or beam.

Figure 3B:
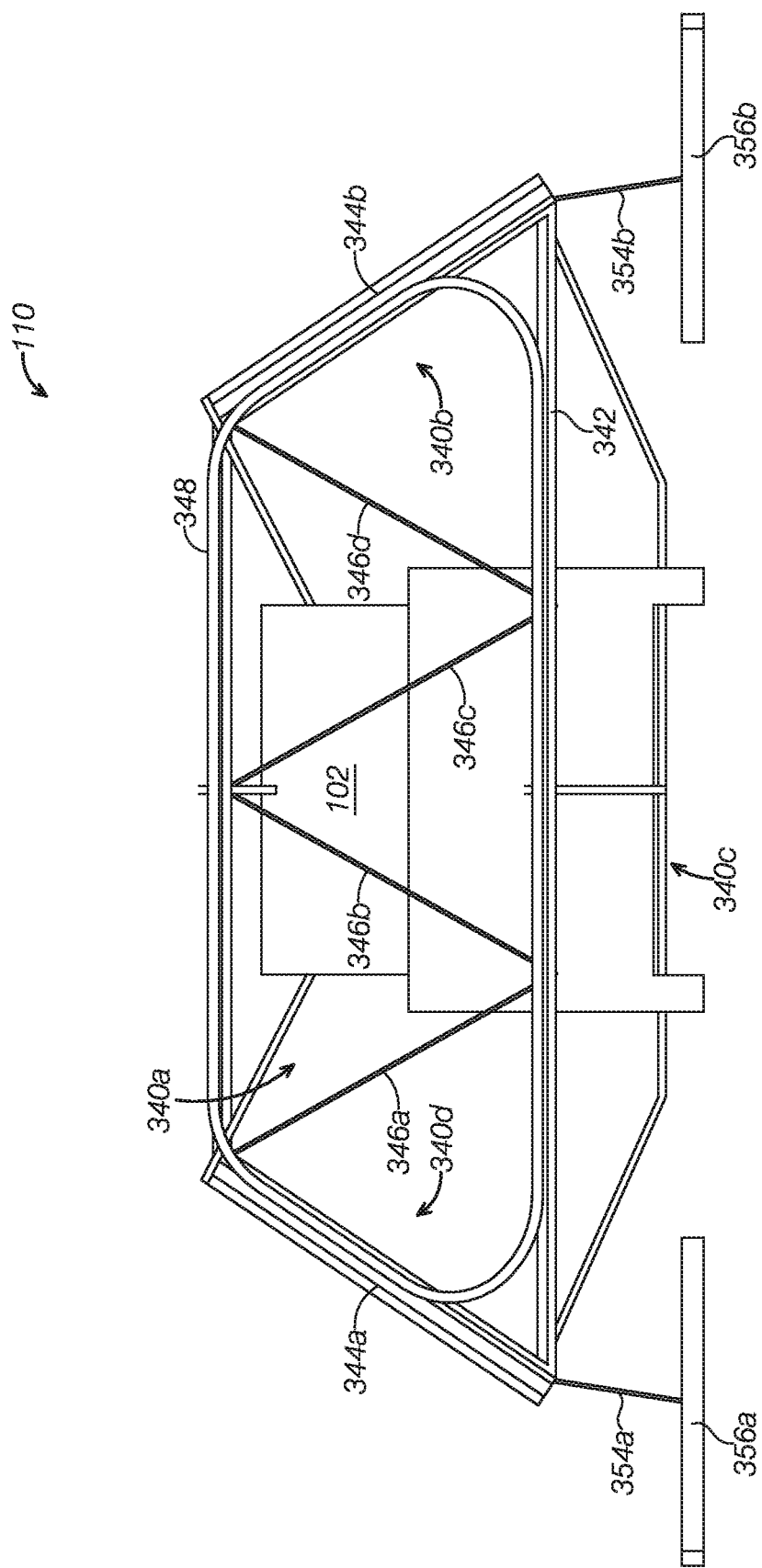
FIG. 3B illustrates a side view of the structure, according to an embodiment.

FIG. 3B illustrates a side view of the structure 110, according to an embodiment. Some of the features in FIG. 3B are the same or similar to some of the features in FIG. 1A-3A as noted by same reference numbers, unless expressly described otherwise. The structure 110 may include footing to support the sub-structures 340a-340d. In one embodiment, the sub-structure 340a may include a first support beam 354a and a first footing 356a to connect to the first side support 344a and/or the base support 342. The first support beam 354a and the first footing 356a may support a first side of the sub-structure 340a. In another embodiment, the sub-structure 340b may include a second support beam 354b and the second footing 356b to connect to the second side support 344b and/or the base support 342. The second support beam 354b and the second footing 356b may support a second side of the sub-structure 340a.

In one embodiment, the first footing 356a and/or the second footing 356b may be a pipe, a beam, a board, and so forth. In one example, the first footing 356a and/or the second footing 356b may be a 4×6 treated timber that are lagged into a curb of the RTU 102 or the ground, a floor, or a roof of a building. The first footing 356a and the second footing 356b may extend out past the RTU 102 in both directions, such as extending approximately 7 feet. The second sub-structure 340b, the third sub-structure 340c, and/or the fourth sub-structure 340d may include similar support beams and footings. In one example, the structure 110 may include a support beam and a footing at each corner at the bottom of the structure 110. In one embodiment, a length of the footing may vary to disperse a weight of the solar air heating system 100, as shown in FIG. 1A. In one example, a structural or building requirement may define an amount of weight that may be applied to a roof of a building over a defined area of the roof. In this example, the length of one or more of the footings may be increased or decrease to disperse the weight of the solar air heating system 100 according to the structural or building requirement.

Figure 3C:
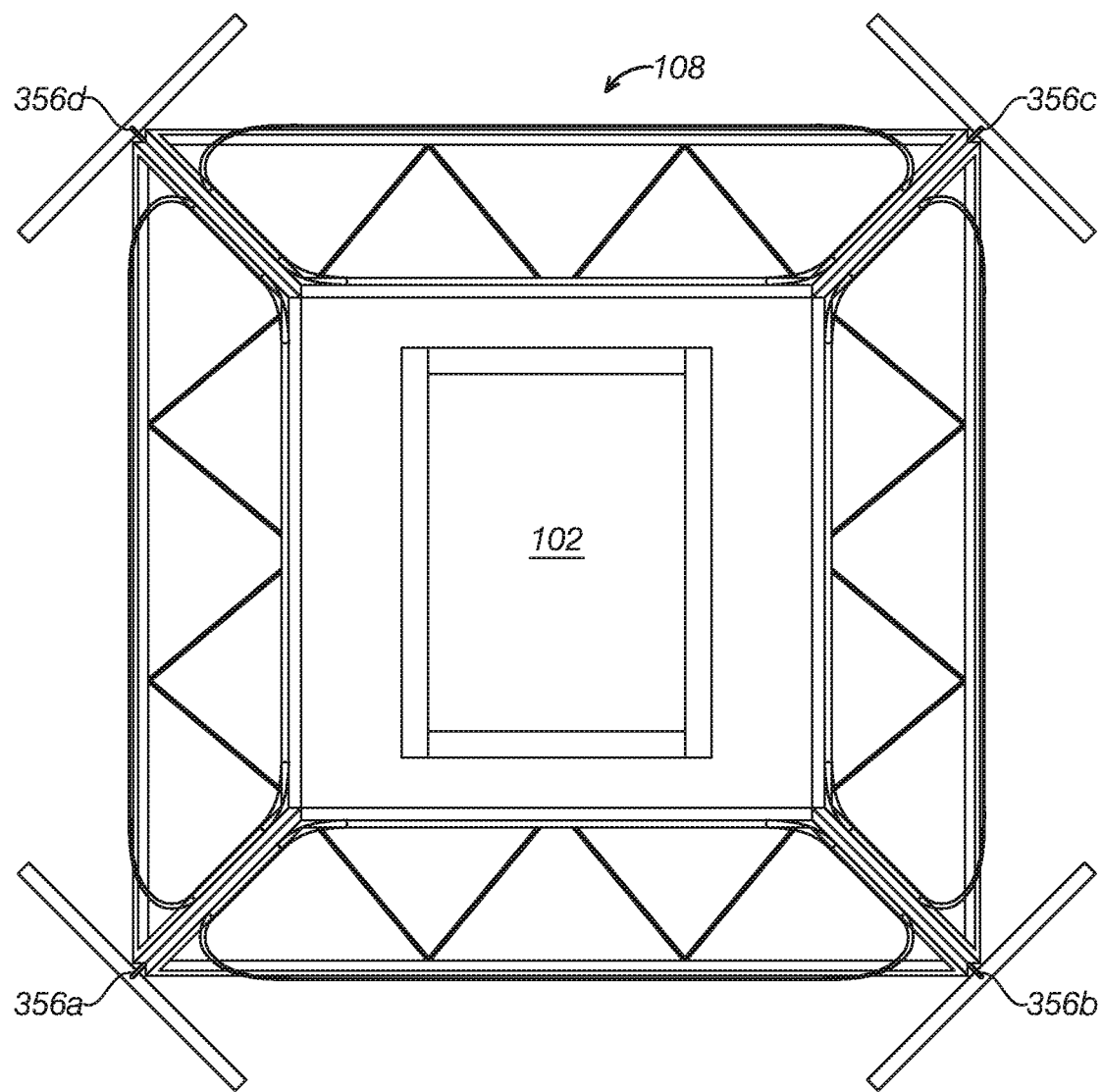
FIG. 3C illustrates a top view of the structure, according to an embodiment.

FIG. 3C illustrates a top view of the structure 110, according to an embodiment. Some of the features in FIG. 3C are the same or similar to some of the features in FIGS. 1A-3B as noted by same reference numbers, unless expressly described otherwise. As discussed above, the structure 110 may include footings to support the structure 110 and fasten the structure 110 to the ground or a floor of a roof. In one embodiment, the structure may include a first footing 356a at a first corner of the structure 110, a second footing 356b at a second corner of the structure 110, a third footing 356c at a third corner of the structure 110, and a fourth footing 356d at a fourth corner of the structure 110. The first footing 356a, the second footing 356b, the third footing 356c, and the fourth footing 356d may support the structure 110 and may disperse the weight of the structure 110 across a portion of the ground or the floor of a roof. The structure 110 may provide a frame to hold the barriers 112a-112d to provide a visual boundary or barrier to restrict an individual from unintentionally accessing the RTU 102.

Figure 4A:
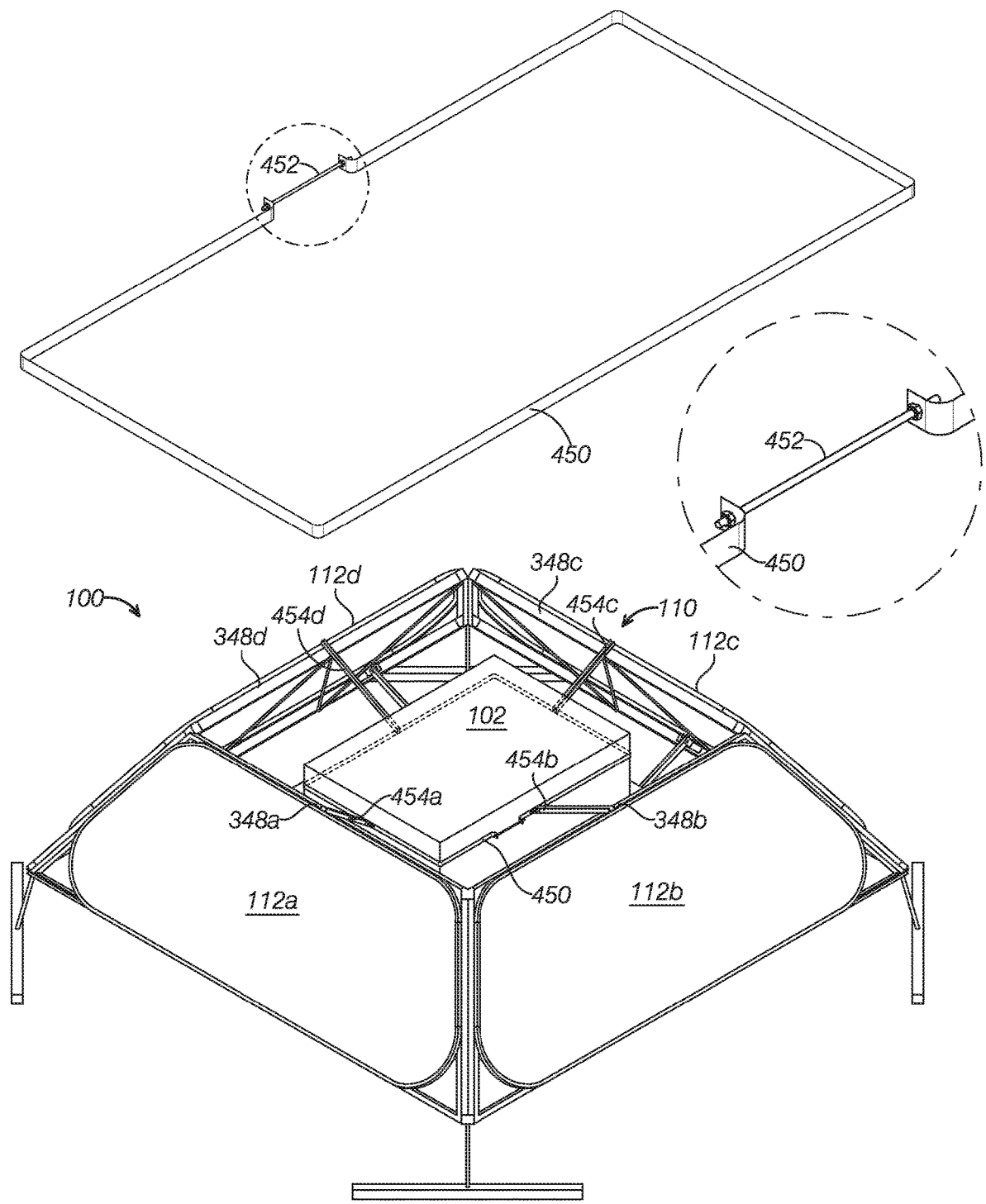
FIG. 4A illustrates a strap to connect the structure to the RTU the solar air heating system, according to an embodiment.

FIG. 4A illustrates a strap 450 to connect the structure 110 to the RTU 102 of the solar air heating system 100, according to an embodiment. Some of the features in FIG. 4A are the same or similar to some of the features in FIGS. 1A-3C as noted by same reference numbers, unless expressly described otherwise. In one embodiment, the strap 450 may be connected to the RTU 102 by extending around a perimeter of the RTU 102. In one example, as the size and circumference of the perimeter of the RTU 102 may vary, the strap 450 may include an adjuster 452 to increase or decrease a circumference of the strap 450.

In one embodiment, the strap 450 may be a metal strap that extends around a perimeter of a top portion of the RTU 102. The adjuster 452 may be a bolt that connects a first end of the strap 450 to a second end of the strap 450. A nut may be located on one end or both ends of the bolt. As the bolt is fastened or tightened, the circumference of the strap 450 may be reduced and as the bolt is unfastened or untightened, the circumference of the strap 450 may be increased. In another embodiment, the strap 450 may be a tie down strap and the adjuster 452 may be a ratchet to adjust a size of the circumference of the strap 450. In another embodiment, the strap 450 may be a strip of material and the adjuster 452 may be a buckle to adjust a length of the strap 450.

In another embodiment, the structure 110 may include one or more connector beams 454a-454d to connect the structure 110 to the RTU 102 via the strap 450. In one example, a first connector beam 454a may connect to a top beam 348a for the first sub-structure 340a. The first connector beam 454a may extend from the first top beam 348a to a first side of the strap 450 to fasten the first top beam 348a to the strap 450. In another example, a second connector beam 454b may connect to a second top beam 348b for the second sub-structure 340b. The second connector beam 454b may extend from the second top beam 348b to a second side of the strap 450 to fasten the second top beam 348b to the strap 450. In another example, a third connector beam 454c may connect to a third top beam 348c for the third sub-structure 340c. The third connector beam 454c may extend from the third top beam 348c to a third side of the strap 450 to fasten the third top beam 348c to the strap 450. In another example, a fourth connector beam 454d may connect to a fourth top beam 348d for the fourth sub-structure 340d. The fourth connector beam 454d may extend from the fourth top beam 348d to a fourth side of the strap 450 to fasten the fourth top beam 348d to the strap 450.

The first connector beam 454a, the second connector beam 454b, the third connector beam 454c, and/or the fourth connector beam 454d may fasten to the top beams 348a-348d and the sides of the strap 450, respectively, by a fastener. The fastener may be a nut and bolt, epoxy, a loop and hook, and so forth. A number of the connector beams is not intended to be limiting. The solar air heating system 100 may include a single connector beam or multiple connector beams.

Figure 4B:
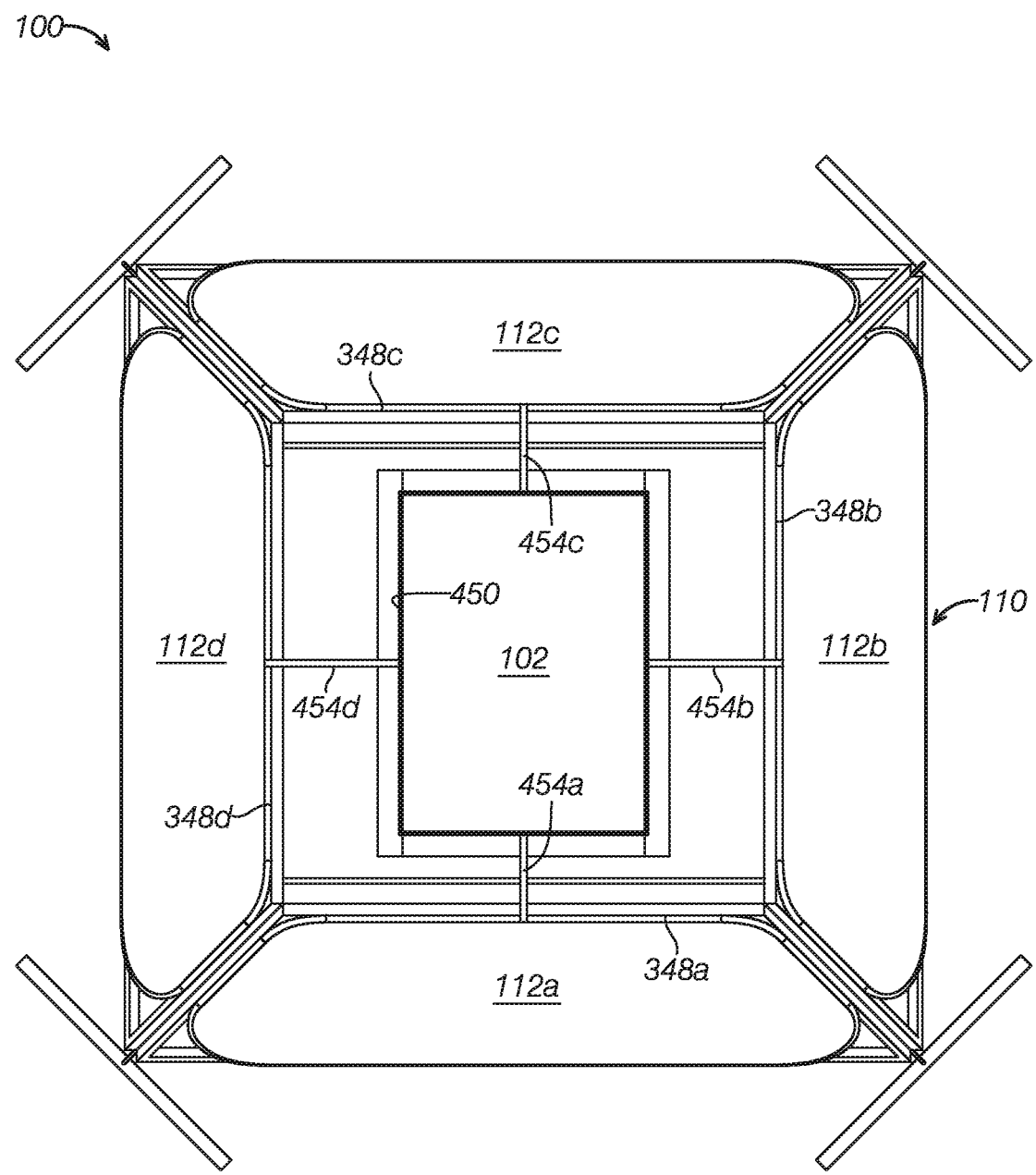
FIG. 4B illustrates a top view of the structure connected to the RTU, according to an embodiment.

FIG. 4B illustrates a top view of the structure 110 connected to the RTU 102, according to an embodiment. Some of the features in FIG. 4B are the same or similar to some of the features in FIGS. 1A-4A as noted by same reference numbers, unless expressly described otherwise. As discussed above, the connector beams 454a-454d may connect the top beams 348a-348d to the strap 450, respectively. Connecting the top beams 348a-348d to the strap 450 may secure the structure 110 to the RTU 102. When winds blow across the solar air heating system 100, the secure connection of the structure 110 to the RTU 102 may reduce or eliminate the movement of the structure 110 by the wind. Additionally, the secure connection may reduce or eliminate the structure 110 being accidentally moved when an individual bumps into the structure 110.

Figure 5:
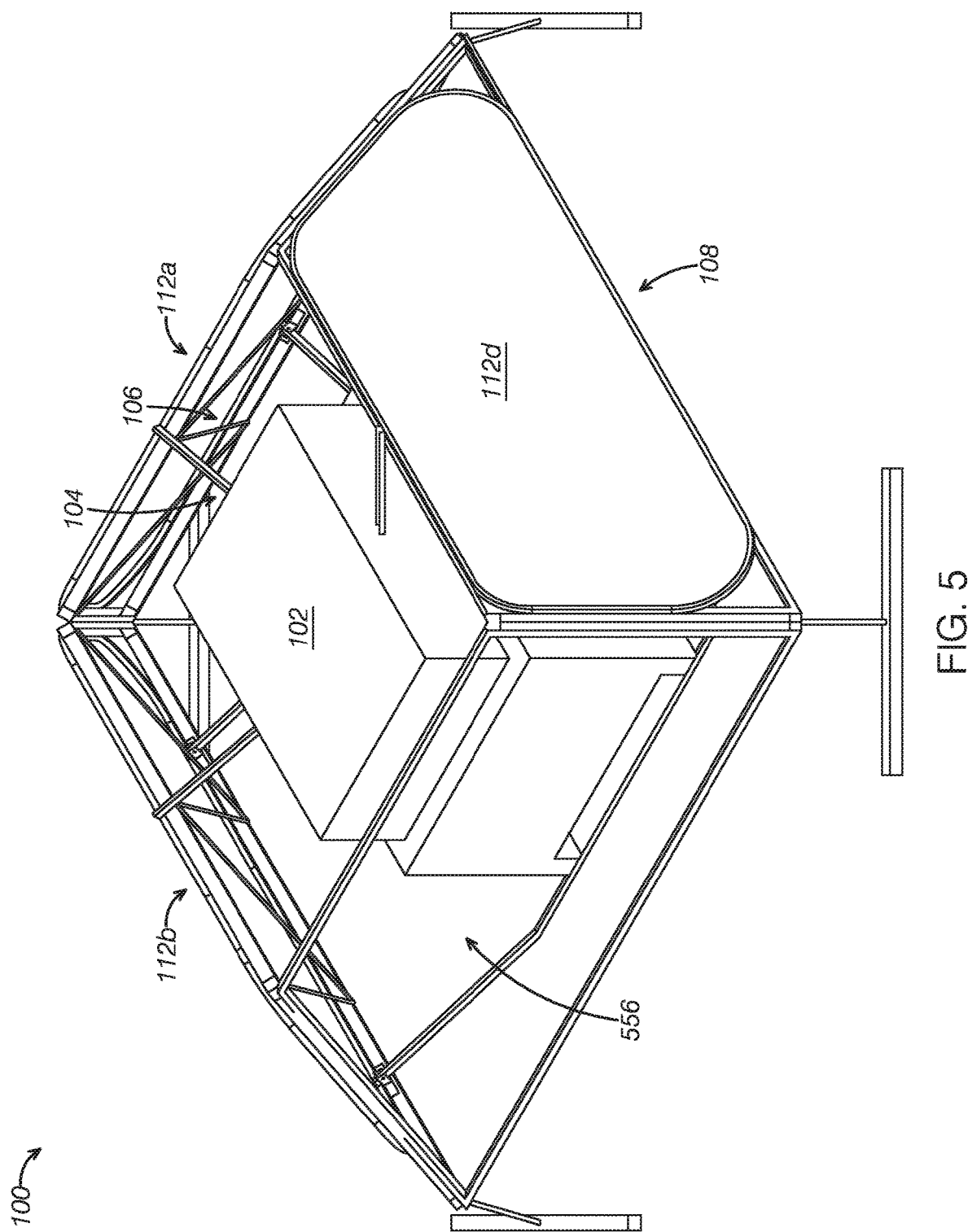
FIG. 5 illustrates a top perspective view of the barrier system without a barrier on a side of the barrier system, according to an embodiment.

FIG. 5 illustrates a top perspective view of the barrier system 108 without a barrier on a side 556 of the barrier system 108, according to an embodiment. Some of the features in FIG. 5 are the same or similar to some of the features in FIGS. 1A-4B as noted by same reference numbers, unless expressly described otherwise. As discussed above, the barrier system 108 may provide a visual boundary or barrier to restrict an individual from unintentionally accessing the chamber 104 and the RTU 102. In one embodiment, the RTU 102 may be located against or approximate another structure, such as a wall, a door, an edge of a roof, or a relatively large object. When the RTU 102 is located against or approximate the other structure, the barrier system 108 may not include a barrier on the side of the barrier system 108 that faces the other structure. In one embodiment, when the side 556 of the barrier system 108 is located against or approximate a wall, the barrier system 108 may not include a barrier on side 556. For example, when the side 556 corresponds with the side where barrier 112c is located in FIG. 1A, the barrier system 108 may not include the barrier 112c as part of the barrier system 108. In one example, eliminating the barrier 12c from the barrier system 108 may reduce a weight of the solar air heating system 100. In another example, eliminating the barrier 112c from the barrier system 108 may reduce a surface area of the barrier system 108 that may be caught by wind and move or damage the solar air heating system 100.

The disclosure above encompasses multiple distinct embodiments with independent utility. While each of these embodiments has been disclosed in a particular form, the specific embodiments disclosed and illustrated above are not to be considered in a limiting sense as numerous variations are possible. The subject matter of the embodiments includes all novel and non-obvious combinations and sub-combinations of the various elements, features, functions and/or properties disclosed above and inherent to those skilled in the art pertaining to such embodiments. Where the disclosure or subsequently filed claims recite "a" element, "a first" element, or any such equivalent term, the disclosure or claims are to be understood to incorporate one or more such elements, neither requiring nor excluding two or more such elements.

Applicant(s) reserves the right to submit claims directed to combinations and sub-combinations of the disclosed embodiments that are believed to be novel and non-obvious. Embodiments embodied in other combinations and sub-combinations of features, functions, elements and/or properties may be claimed through amendment of those claims or presentation of new claims in the present application or in a related application. Such amended or new claims, whether they are directed to the same embodiment or a different embodiment and whether they are different, broader, narrower or equal in scope to the original claims, are to be considered within the subject matter of the embodiments described herein.

The invention claimed is:

1. A method of preheating air that is supplied to a rooftop air handling unit (RTU), comprising:
   preheating air in an air collector,
      wherein the air collector is part of a barrier system surrounding the RTU,
      wherein the air collector defines a cavity configured to store air, and
      wherein a surface portion of the air collector includes a material to convert solar energy into thermal energy and transfer the thermal energy to preheat the air stored within the cavity of the air collector;
   comparing a temperature of outside air proximate to the RTU with a threshold temperature;
   providing the outside air to the RTU in response to the temperature of outside air being at least equal to the threshold temperature; and
   providing the preheated air within the cavity of the air collector to the RTU in response to the temperature of the outside air being less than the threshold temperature.

2. The method of claim 1, wherein the air collector is coupled to a chamber that communicates the preheated air, and wherein the chamber is disposed between the air collector and an opening of the RTU that is configured to receive air, the method further comprising:
   operating a diverter in the chamber into a first position to divert the preheated air within the cavity of the air collector to the opening of the RTU; and
   operating the diverter in the chamber into a second position to divert the outside air to the opening of the RTU.

3. The method of claim 2, wherein the air collector transfers the preheated air to the chamber from the cavity of the air collector when the diverter is operated to the first position, and wherein the outside air enters an opening disposed in the chamber when the diverter is operated in the second position.

4. The method of claim 3,
   wherein the second position places the diverter in a substantially vertical position that divides the chamber into a first portion and a second portion,
   wherein the opening of the chamber is in the second portion of the chamber,
   wherein the first position places the diverter in a horizontal position that is substantially coplanar with a bottom of the chamber so that the first portion of the chamber is connected to the second portion of the chamber, and wherein the diverter covers the opening in the second portion of the chamber when the diverter is in the first position.

5. The method of claim 4, further comprising:
operating a fan in the RTU when the diverter is in the first position to draw the preheated air from the air collector into the first and second portions of the chamber and then into the opening of the RTU; and
operating the fan in the RTU when the diverter is in the second position to draw the outside air into second portion of the chamber and then into the opening of the RTU.

6. The method of claim 4, further comprising:
operating a fan in the chamber when the diverter is in the first position to draw the preheated air from the air collector into the first and second portions of the chamber and then into the opening of the RTU; and
operating the fan in the chamber when the diverter is in the second position to draw the outside air into second portion of the chamber and then into the opening of the RTU.

7. The method of claim 1, wherein the air collector includes a barrier that separates the air collector from the outside, and wherein solar energy warms the material of the barrier, the method further comprising:
drawing air though the heated material of the barrier into the cavity of the air collector to preheat the air,
wherein the preheated air is stored within the cavity of the air collector.

8. The method of claim 7, wherein the barrier includes a collector plate that heats up when bombarded by solar energy, and wherein the collector plate radiates heat into the air collector to further heat the air in the cavity of the air collector.

9. A method of preheating air that is supplied to a rooftop air handling unit (RTU), comprising:
assembling a structure around the RTU, wherein the structure has a base support, a plurality of side supports, and a top support;
attaching a plurality of barriers to the base support, the side supports and the top support of the structure;
attaching an air collector to the structure, wherein the air collector includes a material to convert solar energy into thermal energy, and wherein the material transfers thermal energy to preheat the air stored within a cavity of the air collector; and
locating a chamber within the within the structure, wherein the chamber is coupled to an opening of the RTU that is configured to receive air, and wherein the chamber is coupled to the cavity of the air collector,
wherein in response to a temperature of outside air being at least equal to a threshold temperature, outside air is provided to an opening disposed in the chamber so that outside air is moved to the opening of the RTU, and
wherein in response to the temperature of outside air being less than the threshold temperature, the preheated air within the cavity of the air collector is transferred into the chamber and then into to the opening of the RTU.

10. The method of claim 9, further comprising:
operating a diverter in the chamber into a first position to divert the preheated air within the cavity of the air collector to the opening of the RTU; and
operating the diverter in the chamber into a second position to divert the outside air to the opening of the RTU.

11. The method of claim 10, wherein the air collector transfers the preheated air to the chamber from the cavity of the air collector when the diverter is operated to the first position, and wherein the outside air enters the opening disposed in the chamber when the diverter is operated in the second position.

12. The method of claim 11,
wherein the second position places the diverter in a substantially vertical position that divides the chamber into a first portion and a second portion,
wherein the opening of the chamber is in the second portion of the chamber,
wherein the first position places the diverter in a horizontal position that is substantially coplanar with a bottom of the chamber so that the first portion of the chamber is connected to the second portion of the chamber, and
wherein the diverter covers the opening in the second portion of the chamber when the diverter is in the first position.

13. The method of claim 12, further comprising:
operating a fan in the RTU when the diverter is in the first position to draw the preheated air from the air collector into the first and second portions of the chamber and then into the opening of the RTU; and
operating the fan in the RTU when the diverter is in the second position to draw the outside air into second portion of the chamber and then into the opening of the RTU.

14. The method of claim 12, further comprising:
operating a fan in the chamber when the diverter is in the first position to draw the preheated air from the air collector into the first and second portions of the chamber and then into the opening of the RTU; and
operating the fan in the chamber when the diverter is in the second position to draw the outside air into second portion of the chamber and then into the opening of the RTU.

15. The method of claim 9, wherein the air collector includes a barrier that separates the air collector from the outside, and wherein solar energy warms the material of the barrier, the method further comprising:
drawing air though the heated material of the barrier into the cavity of the air collector to preheat the air,
wherein the preheated air is stored within the cavity of the air collector.

16. The method of claim 15, wherein the barrier includes a collector plate that heats up when bombarded by solar energy, and wherein the collector plate radiates heat into the air collector to further heat the air in the cavity of the air collector.

17. A device comprising:
a barrier system configured to surround a rooftop air handling unit (RTU), wherein the barrier system comprises:
a structure to provide a frame for the barrier system;
a plurality of barriers configured to connect to corresponding sides of the structure; and
an air collector configured to connect to a first side of the structure, the collector comprising a cavity configured to store air, wherein the air collector includes a material to convert solar energy into thermal energy and transfer the thermal energy to the air stored within the cavity;
an air duct configured to connect between the air collector and a chamber; and the chamber located within the barrier system and configured to connect to an air intake of the RTU, the chamber comprising:
  a first opening to receive the air stored in the cavity of the air collector;
  a second opening to receive external air;
  a diverter configured to switch between a first position to direct the air from the cavity of the air collector to an air intake hood of the RTU and a second position to direct the external air to the air intake hood of the RTU; and
  a motor configured to switch the diverter between the first position and the second position.

18. The device of claim 17, wherein the motor is configured to switch the diverter from the first position to the second position when an external temperature exceeds a threshold temperature level.

19. The device of claim 17,
  wherein the second position places the diverter in a substantially vertical position that divides the chamber into a first portion and a second portion,
  wherein the opening of the chamber is in the second portion of the chamber,
  wherein the first position places the diverter in a horizontal position that is substantially coplanar with a bottom of the chamber so that the first portion of the chamber is connected to the second portion of the chamber, and
  wherein the diverter covers the opening in the second portion of the chamber when the diverter is in the first position.

20. The device of claim 17, wherein the material of the collector is a black fabric material that heats up when bombarded by solar energy.

* * * * *